(12) United States Patent
Vikberg et al.

(10) Patent No.: US 8,660,516 B2
(45) Date of Patent: Feb. 25, 2014

(54) EMERGENCY NOTIFICATION METHOD AND A NODE

(75) Inventors: Jari Vikberg, Järna (SE); Jens Bergqvist, Linöping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 321 days.

(21) Appl. No.: 13/063,900

(22) PCT Filed: Dec. 3, 2008

(86) PCT No.: PCT/SE2008/051395
§ 371 (c)(1),
(2), (4) Date: Mar. 14, 2011

(87) PCT Pub. No.: WO2010/033062
PCT Pub. Date: Mar. 25, 2010

(65) Prior Publication Data
US 2011/0171928 A1 Jul. 14, 2011

Related U.S. Application Data

(60) Provisional application No. 61/097,585, filed on Sep. 17, 2008.

(51) Int. Cl.
*H04M 11/04* (2006.01)
(52) U.S. Cl.
USPC .................. 455/404.1; 455/404.2; 379/45
(58) Field of Classification Search
USPC ........................................... 455/404.1, 404.2
See application file for complete search history.

(56) References Cited

U.S. PATENT DOCUMENTS

| 2002/0160745 | A1 | 10/2002 | Wang |
| 2003/0143974 | A1* | 7/2003 | Navarro .................. 455/404 |
| 2009/0176474 | A1* | 7/2009 | Bajko ..................... 455/404.1 |
| 2010/0041364 | A1* | 2/2010 | Lott et al. ............... 455/404.1 |

FOREIGN PATENT DOCUMENTS

JP 2001-169010 A 6/2001

OTHER PUBLICATIONS

International Search Report, PCT Application No. PCT/SE2008/051395, Jun. 29, 2009.

(Continued)

*Primary Examiner* — Huy C Ho
(74) *Attorney, Agent, or Firm* — Myers Bigel Sibley & Sajovec, P.A.

(57) ABSTRACT

A network controller node is configured to transmit an emergency message to a mobile station within a cell of an access point connected to the network controller node within a telecommunications network. The network controller node receives information of the mobile station and determines a location of the mobile station based on the received information. In addition, the network controller node receives an emergency notification comprising an indicator indicating an affected area and determines that the mobile station is within the indicated affected area based on the determined location. The network controller node then transmits the emergency message via the access point to the mobile station in the cell.

17 Claims, 6 Drawing Sheets

(56) References Cited

OTHER PUBLICATIONS

Global System for Mobile Communications, "$3^{rd}$ Generation Partnership Project; Technical Specification Group Services and System Aspects; Earthquake and Tsunami Warning System Requirements and Solutions (ETWS); Solution Placeholder (Release 8)," 3GPP Draft; 23828-100, $3^{rd}$ Generation Partnership Project (3GPP), vol, TSG SA, no. Prague, Czech Republic; 20080512, XP050211167, Jun. 2, 2008.

International Preliminary Report on Patentability and Written Opinion of the International Searching Authority, PCT Application No. PCT/SE2008/051395, Feb. 4, 2011 (13 pages).

Japanese Office Action Corresponding to Japanese Patent Application No. 2011-527769; Mailing Date: Mar. 22, 2013; 3 pages, (Foreign Text Only).

* cited by examiner

US 8,660,516 B2

EMERGENCY NOTIFICATION METHOD AND A NODE

CROSS REFERENCE TO RELATED APPLICATIONS

This application is a 35 U.S.C. §371 national stage application of PCT International Application No. PCT/SE2008/051395, filed on 3 Dec. 2008, which itself claims priority to U.S. provisional patent Application No. 61/097,585, filed 17 Sep. 2008, the disclosure and content of both of which are incorporated by reference herein in their entirety. The above-referenced PCT International Application was published in the English language as International Publication No. WO 2010/033062 A1 on 25 Mar. 2010.

TECHNICAL FIELD

The invention relates to a method and a node in a telecommunications network, in particular, for transmitting an emergency message to a mobile station.

BACKGROUND

Today there is work ongoing to provide different types of public warnings systems in order to, for example, introduce support for an Earthquake Tsunami Warning System (ETWS), enabling transmission of warning notifications about coming earthquakes and/or tsunamis through mobile stations. The ETWS warning notifications are divided into two types, a primary notification and a secondary notification.

The ETWS primary notification is sent in order to notify users about the most urgent event in seconds rather than minutes, such as imminent occurrence of an earthquake and the like. There are requirements to reach the users/mobile stations with an ETWS primary notification message within 4 seconds. In order to avoid that fake messages are received causing chaos, inclusion of authentication information in the primary notification will most likely be needed. An alternative to authenticate the information is to have authentication information in the form of a digital signature, e.g. 41 bytes if using Digital Signature Algorithm, DSA, signatures and/or the like.

The secondary notification is sent to give the users supplementary information that is of lesser urgency, such as instructions on what to do, where to get help, e.g. map to refuge facilities, time table of food distribution, and/or the like.

A Cell Broadcast Service (CBS) based solution has been envisaged for transmission of the ETWS warning notifications, wherein a ETWS message is broadcasted on control channel to all mobile stations within a cell.

Emergency messaging services aims to send warning messages only within affected areas. Also, for transmission of ETWS warning notifications within radio access network, for example, GSM EDGE Radio Access Network, GERAN, consists of notifying the users in idle mode through the broadcasted control channels that there is an ongoing warning. However, mobile stations that are not listening to the control channels in the macro networks would thus not receive the warning notifications that are sent in the macro networks while they are in, for example, Genericc Access Network, GAN, mode.

Similar problems exist in the case of different femtocell solutions, e.g. GSM, WCDMA, LTE Femto solutions and/or the like. These cells can also be deployed by the end users almost anywhere without interaction with the operator.

SUMMARY

It is an object of embodiments herein to provide an efficient distribution of emergency warning notifications to mobile stations.

Embodiments herein relate to a method in a network controller node for transmitting an emergency message to a mobile station within a cell of an access point base connected to the network controller node within a telecommunications network. The network controller node receives information of the mobile station and determines location of the mobile station based on the received information. In addition, the network controller node receives an emergency notification comprising an indicator indicating affected area and determines that the mobile station is within the indicated affected area based on the determined location. That being the case, the network controller node then transmits the emergency message, via the access point base station, to the mobile station in the cell.

Embodiments herein also relate to a network controller node arranged to control at least one access point comprising a cell. The network controller node comprises a first network interface arranged to connect the network controller node to a core telecommunications network and to receive an emergency notification comprising an indicator indicating affected area. Furthermore, the network controller node comprises a second network interface arranged to connect the network controller node to the at least one access point. In addition, the network controller node is arranged to receive information of a mobile station within the cell of the at least one access point and comprises a control unit arranged to determine location of the mobile station based on the received information. The control unit is further arranged to determine that the mobile station is within the indicated affected area based on the determined location and, that being the case, to transmit an emergency message to the mobile station via the access point over the second network interface.

ETWS warning notifications are transmitted to mobile stations in cells, such as micro/pico/GAN cells, only if they are in the affected geographical area. Same applies to femtocells i.e. only femtocells in the affected geographical area will forward the ETWS warning notifications to mobile stations camping or connected to these femtocells.

BRIEF DESCRIPTION OF THE DRAWINGS

Embodiments will now be described in more detail in relation to the enclosed drawings, in which.

DETAILED DESCRIPTION

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
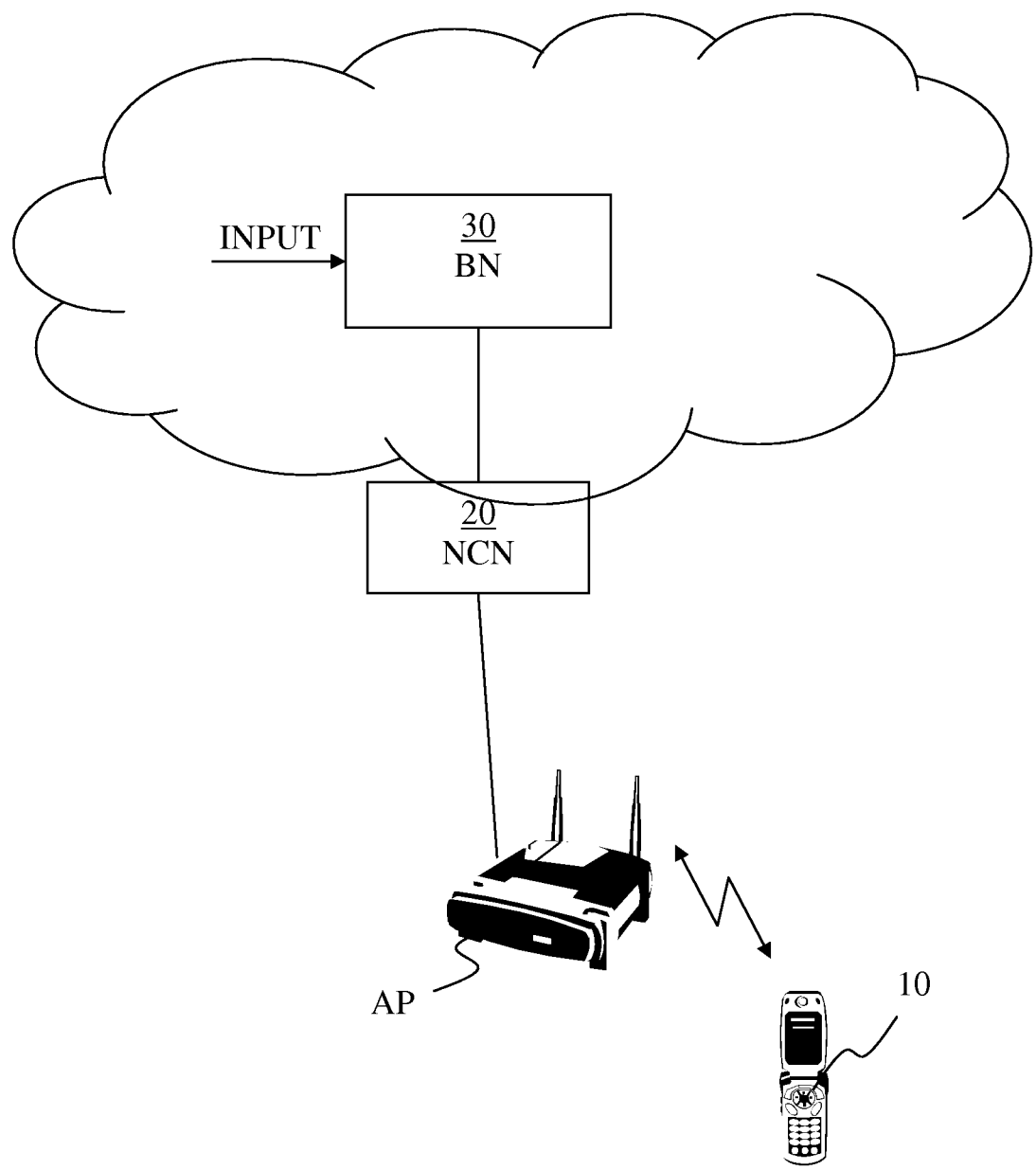
FIG. 1 shows a schematic overview of an exemplary emergency notification system.

FIG. 1 discloses a schematic overview of an emergency notification system. The notification system comprises a broadcasting node BN 30, such as a Cell Broadcasting Centre, CBC, or the like, arranged to broadcast an emergency notification initiated manually, by a detection system and/or the like.

The emergency notification is transmitted to a network controller node NCN 20, such as a RNC, eNB, GAN Controller, Femto Base Station Controller and/or the like. The NCN 20 comprises information of a mobile station 10, such as location, IP addresses, and/or the like, enabling the NCN 20 to determine location of the mobile station. For example, the information may comprise location information of a cell of an access point AP in which the mobile station is camped/connected. The mobile station may be any user equipment, such as a mobile telephone, a PDA and/or the like.

The NCN 20 compares the determined location with an indicated affected area in the emergency notification. If it is determined that the mobile station is within the affected area a message indicating an emergency is transmitted to the mobile station via the AP.

The NCN 20 is arranged to control access points AP comprising cells, such as GAN cells, Femto cells, pico cells, micro cells, and/or the like. For example, the AP may be connected to the NCN 20 over an IP connection through an IP network such as the Internet. The NCN 20 is further connected to the telecommunications network via a generic interface such as Interface UMTS lu, and/or the like.

Figure 2:
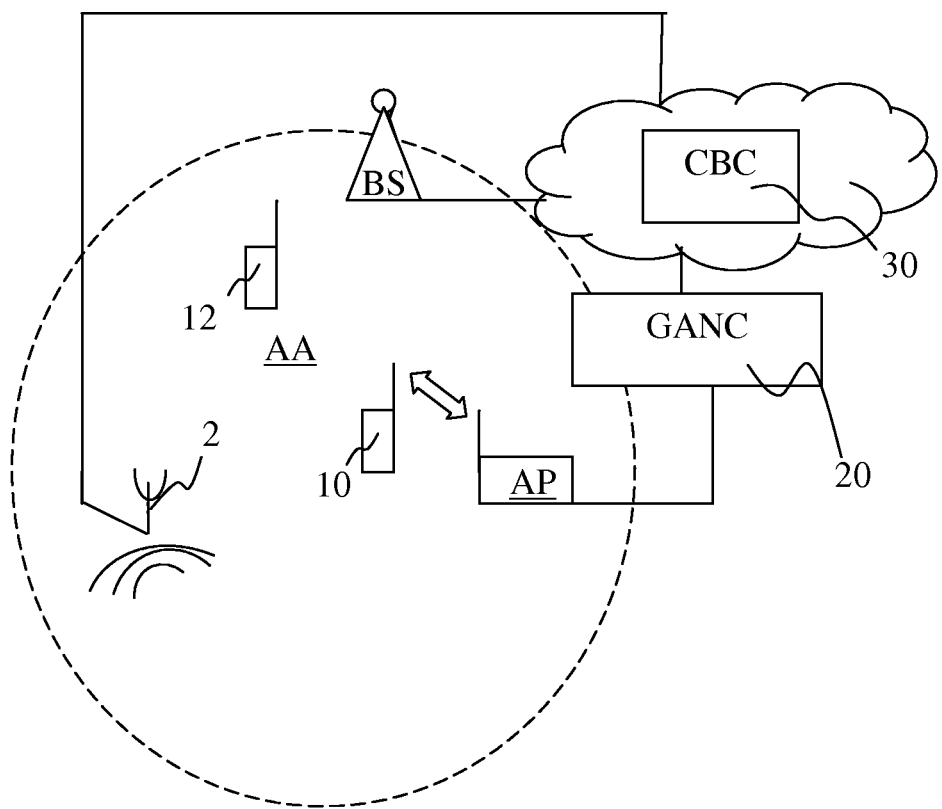
FIG. 2 shows a schematic overview of an exemplary emergency notification system.

FIG. 2 discloses a schematic overview of an emergency notification system. The illustrated example relates to mobile stations within a GAN cell. However, similar solutions are possible to reach mobile stations within Femto cells, pico cells, micro cells, and/or the like.

The system comprises a detector unit 2 arranged to detect an indication of an emergency such as an earthquake and/or the like. The detector unit 2 transmits upon detection a detection indicator that an emergency notification needs to be distributed to mobile stations within an area AA affected by the emergency, for example, by an earthquake, a tsunami, and/or the like.

The indicator is transmitted to a Cell Broadcasting Centre, CBC, 30. It should here be understood that the indicator may be transmitted from a monitoring centre, manually inputted and/or the like, to the CBC 30. The indicator may be distributed to the CBC 30 through a wired network, a wireless network and/or the like.

In the CBC 30 it is determined that an ETWS need to be broadcasted to mobile stations within the affected area. The affected area may be determined within the CBC 30, informed from externally with the indicator from e.g. a monitoring system, and/or the like. The area may be based on the level of detection and/or the like. For example, the affected area may be based on a measured quantity of seismic energy from an earthquake and/or the like.

The ETWS message is created and to the ETWS message an indicator indicating affected area is added.

The ETWS message is then broadcasted to base stations within the affected area, but also to one or more GAN Controllers, GANC, within the affected area. The ETWS message is then broadcasted to mobile stations 12 within a cell of a base station BS of the affected area.

Generic Access Network GAN is a telecommunication system which extends mobile services over IP access networks. Under the GAN system, when a mobile station detects for example a WLAN (Wireless LAN) AP (Access point), it establishes a secure IP connection through a gateway to a server called a GANC on the network. The GANC translates the signals coming from the handset to make it appear to be coming from another base station. The GANC may today send Cell Broadcast Service, CBS, messages to mobile stations in GAN mode that have required so at the GAN registration. The ETWS warning notification could thus be sent in a GA-RC (Resource Control) CELL BROADCAST INFO message to the mobile stations in GAN mode. However, it is significant to only transmit the ETWS warning notification to mobile stations that are located in the affected area, in order to avoid panic in other areas and a mechanism to transmit the ETWS warning notification messages in only affected areas needs to be defined.

In order for a mobile station to receive broadcasted information, the mobile station includes GAN Service Required information indicating that the mobile station requires the cell broadcast service to the GANC during registration or update of registration, for example, in a GA-RC REGISTER REQUEST and/or the like. The GA-RC CELL BROADCAST INFO message is then only sent from the GANC to mobile stations that have indicated that they require receiving the CBS indicated in the Required GAN Services IE (Information Element).

A mechanism for transmission of ETWS warning notifications to mobile stations in GAN mode that are located in the affected geographical area is, for example, disclosed herein. That way, mobile stations that are located in other areas would not receive the corresponding ETWS warning notification, thus avoiding unnecessary panic there. Hence, some embodiments herein disclose:

I. that the information about the affected area, which is received by the GANC from the CBC, shall be compared with the information received of the mobile stations at their latest GAN Registration or GAN Registration Update procedure, and II. that the ETWS warning notification messages is transmitted independent of the existing CBS required information, indicated in the Required GAN Services IE.

Referring back to FIG. 2, the CBC 30 broadcasts the ETWS message to a GANC 20. The GANC 20 reads the ETWS and the indicator indicating affected area AA and compares the affected area AA with reported location of the mobile station 10. The GANC determines that the mobile station is within the affected area AA. The location of the mobile station 10 may be determined based on information from access point AP, mobile station and/or the like.

An emergency message, for example, comprising the ETWS message, is transmitted to the mobile station independently whether the mobile station has requested cell broadcasted service or not.

Similar problems exist in the case of different femtocell solutions, e.g. GSM, WCDMA, LTE Femto solutions and/or the like. These cells may also be deployed by the end users almost anywhere without interaction with the operator. As such there is a need to also know which of the femtocells belong to the affected areas and where the ETWS warning notifications should be forwarded to.

Hence, embodiments are also disclosed where the information about the affected area, which is received by the network controller node from e.g. the "CBC", is compared with the information received by the home base stations during the auto-configuration procedure.

Figure 3:
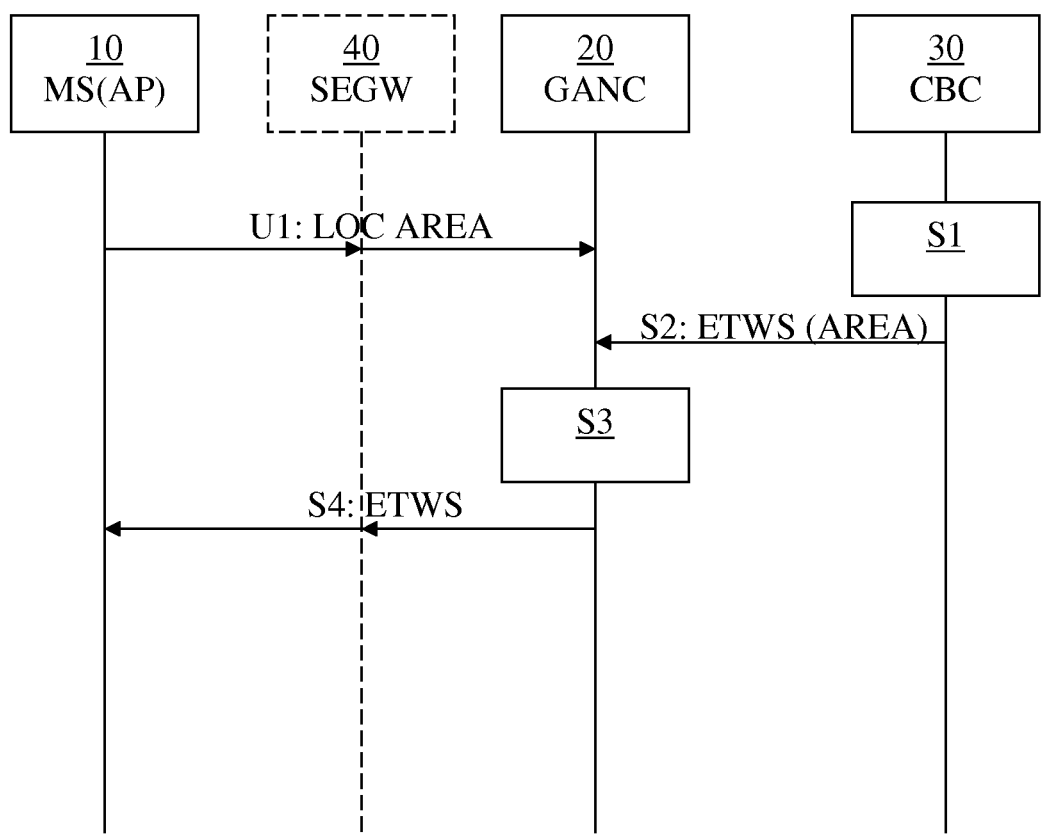
FIG. 3 shows a combined method and signaling scheme of a mobile station registered in a GAN.

FIG. 3 disclose an example of a GAN solution.

In step S1, a Broadcasting Node, such as a CBC 30, registers that a warning message needs to be distributed to a number of mss. The CBC creates an ETWS message and marks the ETWS message with an affected area information.

In step S2, the GANC 20 receives a request to transmit an ETWS warning notification (primary or secondary) within an affected geographical area, from the Cell Broadcast Center (CBC) 30. The GANC does not transmit the message to mobile stations that are located in other areas as the ETWS warning notifications are marked with "affected area" information when entering the GANC 20.

In step U1, the GANC receives information from the ms 10 in a GAN Registration or GAN Registration Update procedure indicating present location area of the ms 10. The information may comprise information indicating that the ms 10 is located in an affected GERAN (or UTRAN) cell at the latest GAN Registration or GAN Registration Update procedure; indicating at the latest GAN Registration or GAN Registration Update procedure that the ms 10 is located at an Access Point, which is known by the network (GANC) to be situated in the affected area; indicating a Geographical Location, e.g. as Longitude/Latitude and/or the like, at the latest GAN Registration or GAN Registration Update procedure, which is situated within the affected area, e.g. in any of the addressed cells received from the CBC; and/or the like.

In step S3, the GANC 30 then uses the information received from the mobile stations at their latest GAN Registration or GAN Registration Update procedure in order to determine what mobile stations to transmit the ETWS warning notification message to by comparing the affected area with the location area of the ms 10.

In step S4, the GANC 30 transmits a message containing the ETWS primary notification to all the mobile stations in GAN mode that are in the affected area. The message containing the ETWS warning notification from the GANC to the mobile stations may be either the existing "cell broadcast" message, GA-RC CELL BROADCAST INFO, a new defined message and/or the like.

The mechanism for the GANC 20 to limit the transmission of the ETWS warning notification to the affected areas only, as indicated by the CBC 30, would be to use the information received from the mobile station 10 at the GAN Registration and GAN Registration Update procedures. The GANC 20 would then transmit the ETWS warning notification only to mobile stations that:

have indicated that they are located in one of the affected GERAN (or UTRAN) cells at the latest GAN Registration or GAN Registration Update procedure, have indicated at the latest GAN Registration or GAN Registration Update procedure that they are located at an Access Point, which is known by the network (GANC) to be situated in the affected area, and/or have indicated a Geographical Location (e.g. as Longitude/Latitude) at the latest GAN Registration or GAN Registration Update procedure, which is situated within the affected area (in any of the addressed cells received from the CBC).

Many mobile stations today indicate that CBS services are not required due to that the user has switched that type of service off. In some embodiments, the GANC 20 transmits the ETWS warning notifications to mobile stations independent of the existing CBS required information (indicated in the Required GAN Services IE). As alternative embodiments, an additional information is added to the Required GAN Services IE stating whether the mobile station supports reception of ETWS warning notifications or not. The GANC 20 would then only transmit the ETWS warning notifications to mobile stations that support ETWS (and which are located in the affected areas). The reason that some mobile stations would not be able to support the ETWS warning notifications is that some kind of integrity check information may be introduced in order to avoid that fake warning notifications are received by the mobile stations.

An additional mechanism for the GANC 20 to become aware of the location of the mobile station would be to use location information as provided by the transport network between the MS and the GANC (or in some scenarios between the MS and a Security Gateway 40, SEGW, indicated with dashed lines). For example, the SEGW 40 may see a public IP address that the MS 10 is using in the communication towards the SEGW 40. This IP address may be used in some scenarios to find out the location of the Access Point being used and the mobile station 10 using this access point (as the coverage area of the Access Point is relatively small). Furthermore, the SEGW 40 may communicate the IP address to the GANC 20 that may further use either locally configured information or another database to find out the location based on the IP address.

Figure 4:
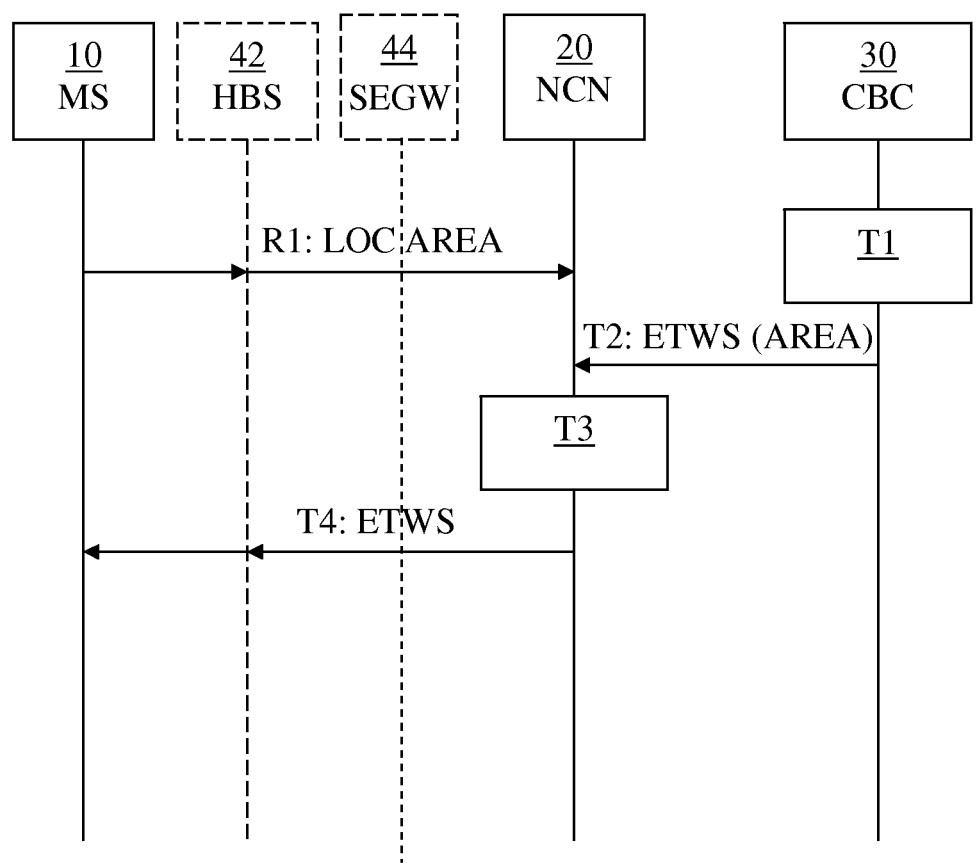
FIG. 4 shows a combined method and signaling scheme of a mobile station registered in Femto cell.

In FIG. 4, an example of a femto solution is shown.

In femto solutions there exists a similar network controller as in the GAN case. In the GSM Femto case this node is a Femto Base Station Controller BSC, in the WCDMA Femto solution the node is a Home NodeB Gateway and in the LTE Femto solution the node is a Home eNodeB Gateway. In the following this node is just called a network controller node, NCN 20.

In step T1, the Cell Broadcast Centre (CBC) 30 determines that a warning notification is to be sent to mobile stations within a certain affected area. The NCN 20, such as a Femto BSC and/or the like, shall not transmit the message to other femtocells that are located in other areas. It is therefore here disclosed that ETWS warning notifications shall be marked with an "affected area" information.

In step T2, the NCN 20 receives a request to transmit an ETWS warning notification (primary or secondary) within the affected geographical area, e.g. from the CBC 30.

In step R1, the NCN 20 receives information from the femto cells (or really the controlling home base stations 42) during for example the auto-configuration procedure. It is assumed that the home base stations may contain an MS receiver that scans the surrounding mobile network coverage and reports this information to the network controller as part of the auto-configuration procedure.

The reported surrounding mobile network coverage may consist for example of:
One or more GERAN/GSM cells identified for example with the Cell Global Identity, CGI and/or Routing Area Identity, RAI,
One or more UTRAN/WCDMA cells identified for example with the Location Area Identifier, LAI, and/or Routing Area Identity, RAI and the 3G Cell Identity,
One or more E-UTRAN/EPS cells identified for example with the tracking area identity, TAI, and the E-UTRAN Cell Global Identity (ECGI),
or any combination of the above.

The information about the reported mobile network coverage (i.e. as detected by an MS receiver in the home base station) may also be reported/signalled to another network node, for example, a node called Automatic Configuration Server (ACS). This node may store the received information either locally or in a network database and make the information available for the network controller node.

In addition, a home base station, HBS, 42 may also be able to indicate a Geographical Location, e.g. as Longitude/Latitude and/or the like, either directly to the NCN 20 or to the ACS that makes this information available to the NCN 20.

In step T3, as the ETWS warning notifications is marked with the "affected area" information when entering the NCN 20, the NCN 20 uses the information received from the femto cells (or really the controlling home base stations).The information is used to decide on whether the femto cell (and hence MS camped/connected thereon) is located in the affected area where the ETWS notification warning messages should be forwarded to.

An additional mechanism for the NCN 20 to become aware of the location of the home base station would be to use location information as provided by the transport network between the HBS 42 and the NCN 20 (or in some scenarios between the HBS 42 and a Security Gateway, SEGW 44). For example, the SEGW 44 may see a public IP address that the HBS 42 is using in the communication towards the SEGW. This IP address may be used in some scenarios to find out the location of the home base station. Furthermore, the SEGW 44 may communicate the IP address to the NCN 20 that may further use either locally configured information or another database to find out the location based on the IP address.

In step T4, the NCN 20 transmits a message containing the ETWS primary notification to all femto cells that are in the affected area and these femto cells send (either broadcast, unicast or multicast) the notifications to all the mobile stations either camping on in idle state in the femto cell and/or ones that are connected to the femto cell in active state.

ETWS warning notifications are transmitted to mobile stations in GAN mode only if they are in the affected geographical area as stated above. Same applies to femto cells i.e. only femto cells in the affected geographical area will forward the ETWS warning notifications to mobile stations camping or connected to these femto cells.

Figure 5:
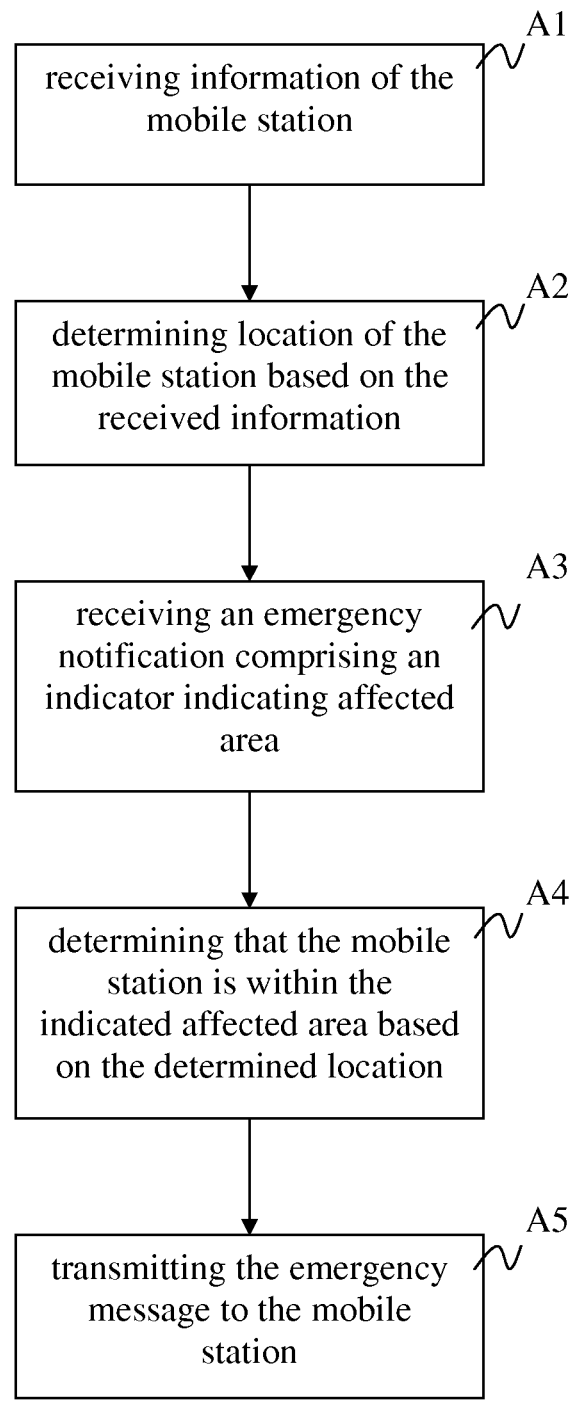
FIG. 5 shows a schematic overview of a method in a network controller node.

In FIG. 5, a schematic overview of a method in a network controller node for transmitting an emergency message to a mobile station in a telecommunications network is shown. The mobile station is active/camped in a cell of an access point. The cell may be a cell of restricted range such as a micro/pico cell. Furthermore, the cell may be a cell wherein mobile stations are not listening to the control channels in the macro network. The cell may be a GAN cell, a Femto cell and/or the like. Theses cells are end user installed cells without a known location.

In step A1, the network controller receives information of the mobile station. The information may come from the mobile station directly, a network node such as a GAN node (e.g. a WLAN AP), a Femto node, a Security Gateway, an O&M node, and/or the like. For example, in some embodiments, a femto base station transmits information of the mobile station to an O&M node that stores the information and the network controller node retrieves the information from the O&M node.

The information may comprise cell identity, Access point identity, IP address, Location area identification, tracking area identity, routing area identity, geographical data such as longitude/latitude, and/or the like. For example, the information may comprise an IP address of an Access Point wherein the mobile station is camped/active and the IP address may be used to find out the location of the Access Point being used and the mobile station using this access point.

In some embodiments, the network controller node receives an indication from the mobile station indicating that the mobile station supports reception of an emergency message. This information may be stored at the network controller node and retrieved during an emergency transmission. The indication may be sent in a message and/or the like.

In step A2, the network controller node determines location of the mobile station based on the received information. For example, location of a home base station HBS would be used to determined location of the mobile station as provided by the transport network between an HBS and the network controller node. A public IP address that the HBS is using in the communication may be used in some scenarios to find out the location of the home base station and consequently the mobile station.

In step A3, the network controller node receives an emergency notification comprising an indicator indicating the affected area.

In step A4, the network controller node determines that the mobile station is within the indicated affected area based on the determined location compared with the indicated affected area.

In step A5, if the determined location is within the affected area, the network controller node transmits the emergency message to the mobile station. In some embodiments, the emergency message is transmitted to mobile stations independent of the existing cell broadcasting system settings, CBS required information.

In some embodiments, the emergency message comprises the emergency notification. It should be understood that in some embodiments the emergency message is a separate message separated from the emergency notification.

In some embodiments, the emergency notification comprises an Earthquake Tsunami Warning System, ETWS, notification.

In order to perform the method a network controller node is provided.

Figure 6:
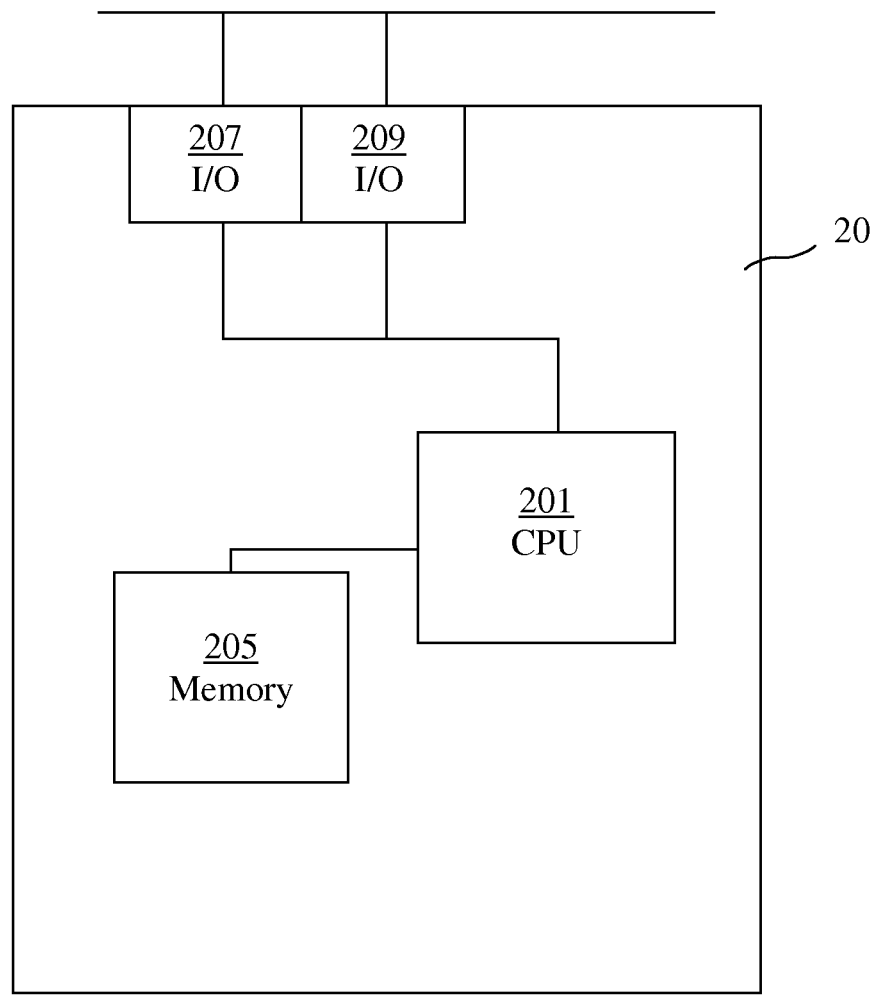
FIG. 6 shows a schematic overview of a network controller node.

In FIG. 6, a schematic overview of a network controller node 20 is shown. The network controller node 20 may comprise a Femto BSC, GAN Controller, HNB Gateway, HeNB Gateway, Femto RNC, and/or the like. The network controller node 20 is arranged to control access points of cells connected to the controller node over an IP network or to communicate directly with the mobile stations over an IP network. The cell may comprise a micro/pico/GAN/Femto cell, and/or the like.

The network controller node 20 comprises a first network interface 207 arranged to receive an emergency notification comprising an indicator indicating affected area. The first network interface 207 is arranged to connect the network controller node 20 to the telecommunications core network, using a standardized interface such as an Iu interface and/or the like. The network controller node 20 further comprises a second network interface 209 connecting the network controller node 20 to at least one (or more) access points, wherein some embodiments the second network interface 209 is arranged to receive information of a mobile station within a cell of the at least one access point. The second interface 209 may, for example, comprise Iuh interface over IP and/or the like. The network controller may also be arranged to receive this information from a third communication node, such as an O&M node, and/or the like, over a different interface.

In some embodiments, the network controller node is arranged to receive an indication from the mobile station indicating that the mobile station supports reception of an emergency message. This information may be stored at the network controller node and retrieved during an emergency transmission.

Furthermore, the network controller node comprises a control unit 201 arranged to determine location of the mobile station based on the received information and to determine that the mobile station is within the indicated affected area based on the determined location. This may be done by comparing the indicated affected area with the determined location/cell area. The received information may comprise cell identity, Access point identity, IP address of the mobile station/access point, Location area identification, tracking area identity, routing area identity, geographical data such as longitude/latitude, and/or the like.

The received information may directly or indirectly indicate the location of the mobile station. For example, in the case of using a femto cell, the femto base station provides information to the network controller node instead of the MS, either directly or via another node, e.g. when the femto base station would send the information to an O&M node where the information would be stored and then later on the network controller node would use the information to decide where to pass the emergency message. This would further be used so that the emergency indication would be sent to all MSs camping or being active in the femto cell. The information may also be sent from a Security Gateway and/or the like.

In a combined solution the MS provides the information to the network and in this case the network uses the received information to decide that all MSs camping or being active in the femtocell or in the GAN cell would need to receive the emergency message. Then the information about the current femto or GAN cell being used may come either from the MS or from the base station/access point.

Additionally, the control unit 201 then, when determined that the mobile station is within the affected area, transmits an emergency message via the access point to the mobile station over the second network interface 209. The emergency message may comprise the emergency notification being; for example, merely the notification forwarded or may be a unique different message created in the radio access network. The emergency message may be transmitted independently whether the mobile station is a registered receiver of a broadcast service in the broadcasting unit/network controller node or not.

The control unit 201 may comprise a Central Processing Unit, a single processing unit, a plurality of processing units, and or the like.

Furthermore, the network controller node 20 may, in some embodiments, comprise a memory unit 205. The memory unit 205 may have data stored thereon, such as information indicating location of mobile station/s, and/or the like. Furthermore, applications may be stored thereon that when executed on the control unit 201 performs the above mentioned method.

The memory unit 205 may comprise a single memory unit, a plurality of memory units, external and/or internal memory units.

Embodiments are described with reference to block diagrams and/or flowchart illustrations of methods, apparatus (systems). It is understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method for operating a network controller node for transmitting an emergency message to a mobile station within a cell of an access point connected to the network controller node within a telecommunications network comprising:
   receiving information associated with the mobile station, the information comprising a routing area identity for routing data to the mobile station through an IP network and the access point;
   determining a location of the mobile station based on the routing area identity from the received information;
   receiving an emergency notification comprising an indicator indicating an affected area;
   determining that the mobile station is within the indicated affected area based on the determined location, and transmitting the emergency message, via the access point, to the mobile station in the cell responsive to determining that the mobile station is within the indicated affected area.

2. A method according to claim 1, wherein the received information associated with the mobile station is received directly from the mobile station.

3. A method according to claim 1, wherein the received information associated with the mobile station is received from at least one of a femto base station and a Security Gateway that provides information to the network controller node.

4. A method according to claim 1 wherein the emergency message is transmitted to mobile station independent of existing cell broadcasting system required information.

5. A method according to claim 1, wherein the emergency message comprises the emergency notification.

6. A method according to claim 1, wherein the emergency notification comprises an Earthquake Tsunami Warning System, ETWS, notification.

7. A method according to claim 1, wherein the cell comprises at least one of a micro/pico/Generic Area Network and a Femto cell.

8. A method for operating a network controller node for transmitting an emergency message to a mobile station within a cell of an access point connected to the network controller node within a telecommunications network, the method comprising:
receiving an indication from the mobile station indicating that the mobile station supports reception of the emergency message;
receiving information associated with the mobile station, the information comprising a routing area identity for routing data to the mobile station through an IP network and the access point;
determining a location of the mobile station based on the routing area identity from the received information;
receiving an emergency notification comprising an indicator indicating an affected area;
determining that the mobile station is within the indicated affected area based on the determined location; and
transmitting, based on the received indication that the mobile station supports reception of the emergency message, the emergency message, via the access point, to the mobile station in the cell responsive to determining that the mobile station is within the indicated affected area.

9. A network controller node configured to control at least one access point comprising a cell, the network controller node comprising:
a first network interface configured to connect the network controller node to a core telecommunications network and to receive an emergency notification comprising an indicator indicating an affected area;
a second network interface configured to connect the network controller node to the at least one access point;
wherein the network controller node is arranged to receive information associated with a mobile station within the cell of the at least one access point, the information comprising a routing area identity for routing data to the mobile station through an IP network and the access point; and
a control unit arranged to determine a location of the mobile station based on the routing area identity from the received information, to determine that the mobile station is within the indicated affected area based on the determined location and, responsive to determining that the mobile station is within the indicated affected area, to transmit an emergency message to the mobile station via the at least one access point over the second network interface.

10. A network controller node according to claim 9, wherein the received information is received directly from the mobile station over the second network interface.

11. A network controller node according to claim 9, wherein the received information is received from at least one of a femto base station and a Security Gateway that provides information to the network controller node over the second network interface.

12. A network controller node according to claim 9, wherein the control unit is configured to transmit the emergency message to the mobile station independent of existing cell broadcasting system required information.

13. A network controller node according to claim 9, wherein the emergency message comprises the emergency notification.

14. A network controller node according to claim 9, wherein the emergency notification comprises an Earthquake Tsunami Warning System, ETWS, notification.

15. A network controller node according to claim 9, wherein the cell comprises at least one of a micro/pico/Generic Area Network and a Femto cell.

16. A network controller node according to claim 9, wherein the network controller node comprises at least one of a Generic Access Node Controller and a Femto Base Station Controller.

17. A network controller node configured to control at least one access point comprising a cell, the network controller node comprising:
a first network interface configured to connect the network controller node to a core telecommunications network and to receive an emergency notification comprising an indicator indicating an affected area;
a second network interface configured to connect the network controller node to the at least one access point;
wherein the network controller node is arranged to receive information associated with a mobile station within the cell of the at least one access point, the information comprising a routing area identity for routing data to the mobile station through an IP network and the access point;
wherein the second network interface is further configured to receive an indication from the mobile station indicating that the mobile station supports reception of the emergency message;
a control unit arranged to determine a location of the mobile station based on the routing area identity from the received information, to determine that the mobile station is within the indicated affected area based on the determined location and, responsive to determining that the mobile station is within the indicated affected area and responsive to the indication that the mobile station supports reception of the emergency message, to transmit an emergency message to the mobile station via the at least one access point over the second network interface.

* * * * *

UNITED STATES PATENT AND TRADEMARK OFFICE
CERTIFICATE OF CORRECTION

| | | |
|---|---|---|
| PATENT NO. | : 8,660,516 B2 | Page 1 of 1 |
| APPLICATION NO. | : 13/063900 | |
| DATED | : February 25, 2014 | |
| INVENTOR(S) | : Vikberg et al. | |

It is certified that error appears in the above-identified patent and that said Letters Patent is hereby corrected as shown below:

On the Title Page, in item (75), under "Inventors", in Column 1, Line 2, delete "Linöping" and insert -- Linköping --, therefor.

Signed and Sealed this
Twenty-sixth Day of August, 2014

Michelle K. Lee
*Deputy Director of the United States Patent and Trademark Office*